US007773292B2

(12) United States Patent
Lynch

(10) Patent No.: US 7,773,292 B2
(45) Date of Patent: Aug. 10, 2010

(54) VARIABLE CROSS-COUPLING PARTIAL REFLECTOR AND METHOD

(75) Inventor: Jonathan J. Lynch, Oxnard, CA (US)

(73) Assignee: Raytheon Company, Waltham, MA (US)

( * ) Notice: Subject to any disclaimer, the term of this patent is extended or adjusted under 35 U.S.C. 154(b) by 1008 days.

(21) Appl. No.: 11/470,422

(22) Filed: Sep. 6, 2006

(65) Prior Publication Data

US 2008/0055188 A1 Mar. 6, 2008

(51) Int. Cl.
*H01Q 15/02* (2006.01)
*G02B 6/28* (2006.01)
*G02B 6/34* (2006.01)

(52) U.S. Cl. .......................... 359/326; 385/11; 385/24; 385/37; 343/753; 343/909

(58) Field of Classification Search .................. 385/11, 385/24, 37; 359/326–332, 483–502; 343/753, 343/909

See application file for complete search history.

(56) References Cited

U.S. PATENT DOCUMENTS

| | | | | |
|---|---|---|---|---|
| 3,842,421 | A * | 10/1974 | Rootsey et al. | 343/909 |
| 4,728,961 | A * | 3/1988 | Bossuet et al. | 343/756 |
| 6,870,511 | B2 * | 3/2005 | Lynch et al. | 343/767 |
| 6,906,685 | B2 * | 6/2005 | English et al. | 343/909 |
| 7,221,827 | B2 * | 5/2007 | Domash et al. | 385/47 |
| 2002/0089462 | A1 * | 7/2002 | Monzon | 343/761 |
| 2002/0149850 | A1 | 10/2002 | Heffner et al. | |
| 2002/0176659 | A1 | 11/2002 | Lei et al. | |

OTHER PUBLICATIONS

J. Lynch and J. Colburn, Modeling Polarization Mode Coupling in Frequency Selective Surfaces, IEEE, pp. 1-13, 2004.

* cited by examiner

*Primary Examiner*—Daniel Petkovsek
(74) *Attorney, Agent, or Firm*—Eric A. Gifford

(57) ABSTRACT

When illuminated with a plane wave a variable cross-coupling partial reflector reflects a specific amount of a cross-polarized field and a specific amount of a co-polarized field and transmits the remaining power with low attenuation. This is achieved with a pair of frequency selective surfaces (FSS) that are rotated with respect to the incident plane wave. The FSSs can be fixed with a given alignment for a particular application or a tuning mechanism can be provided to independently rotate the surfaces and adapt the reflected co- and cross-polarized fields to changing requirements. Of particular interest is the ability to provide a specific amount of cross-polarized reflected power while reflecting no co-polarized field over a certain range of wavelengths. This will be useful to increase power efficiency in, for example, wave power sources that utilize quasi-optical power by causing oscillations in reflection amplifier arrays.

33 Claims, 9 Drawing Sheets

VARIABLE CROSS-COUPLING PARTIAL REFLECTOR AND METHOD

BACKGROUND OF THE INVENTION

1. Field of the Invention

This invention relates to a partial cross-coupling reflector for use in quasi-optical millimeter wave power sources, and more specifically to a variable reflector that can select the amount of reflected power in both the co-polarized (co-pol) and cross-polarized (x-pol) fields.

2. Description of the Related Art

Power is difficult to produce at millimeter wave frequencies due to the lower power output of transistors and the losses incurred by traditional power combiners at these frequencies. Free space combining, also called "quasi optical" combining, eliminates the latter problem by allowing electromagnetic energy to combine in free space. Quasi optical arrays can provide high power by combining the outputs of many (e.g. thousands) of elements.

Quasi optical amplifiers arranged in arrays have been developed by a number of groups to produce high output powers at millimeter wave frequencies. These amplifier arrays amplify incoming radiation, either through reflection or transmission, and reradiate energy typically in a (more or less) gaussian mode. The amplifiers ususally utilize crossed input and output polarizations in order to reduce input/output coupling and avoid oscillation.

Quasi optical sources (oscillators) arranged in arrays have also been developed for millimeter wave power, and consist of a number of individual oscillators that are coupled together so that they mutually synchronize in phase and the radiation from all the elements combines coherently, typically in a (more or less) gaussian mode in front of the oscillator array. A number of different methods exist to realize the coupling network, from printed circuit transmission lines to partial reflectors. The key is to provide strong coupling between elements to ensure in-phase oscillation.

Many quasi optical oscillator arrays utilize hardwire circuitry (e.g. printed circuits, waveguides) to couple together the oscillating elements. For these types of arrays it is very difficult to control or modify the coupling in real time, without resorting to complicated schemes that are difficult to realize. For quasi optical arrays that utilize cavity resonators, the oscillators are usually one port devices (negative resistance oscillators) with a single polarization output, which increases parasitic mutual coupling, creating difficulty in controlling the coupling between elements.

A cavity resonator is typically realized using a total reflector and a partial reflector spaced a distance apart. Multiple reflections between the two reflectors creates standing waves at discrete resonant frequencies. The purpose of the partial reflector is to allow useful power to flow out of the structure. A typical partial reflector consists of a single grating. If the grating is is aligned with the polarization of an incident plane wave, the co-pol field will be reflected. By rotating the grating, specific amounts of the co-pol or x-pol field can be reflected. However, the other component of the reflected field is not controlled. In typical wave sources, one wants to control either the co- or x-pol component while nulling the other component to zero. Therefore the uncontrolled component is dissipated as energy, which makes the source less efficient.

SUMMARY OF THE INVENTION

The present invention provides a partial cross-coupling reflector for use in quasi-optical millimeter wave power sources or other systems that utilize "quasi optical" combining that can select the amount of reflected power in both the co- and x-pol fields.

This is accomplished with a first frequency selective surface (FSS) (e.g. grating) rotated by a first angle $\phi_1$ with respect to the polarization of an incident plane wave and a second FSS spaced behind the first FSS and rotated by a second angle $\phi_d$ with respect to the first FSS. The angles $\phi_1$, $\phi_d$ are selected so that the magnitude of the net reflection of the incident plane wave from the cross-coupling reflector has approximately a specific amount ($\Gamma_{x\text{-}pol}$) of a cross-polarized field of the plane wave and approximately a specific amount ($\Gamma_{co\text{-}pol}$) of a co-polarized field of the plane wave for a specified bandwidth. In one embodiment, the FSSs are fixed at the specified angles. In another embodiment, a tuning mechanism is provided for rotating the first and second FSSs with respect to the polarization of an incident plane wave to the first and second angles. The reflector may be provided with a look-up table of angles ($\phi_1$, $\phi_d$) for specified ($\Gamma_{x\text{-}pol}$, $\Gamma_{co\text{-}pol}$).

These and other features and advantages of the invention will be apparent to those skilled in the art from the following detailed description of preferred embodiments, taken together with the accompanying drawings, in which:

DETAILED DESCRIPTION OF THE INVENTION

The present invention describes a variable cross-coupling partial reflector when illuminated with a plane wave reflects a specific amount of a x-pol field and a specific amount of a co-pol field and transmits the remaining power with low attenuation. This is achieved with a pair of frequency selective surfaces (FSS) that are rotated with respect to the incident plane wave. The FSSs can be fixed with a given alignment for a particular application or a tuning mechanism can be provided to independently rotate the surfaces and adapt the reflected co- and cross-polarized fields to changing requirements. Of particular interest is the ability to provide a specific amount of x-pol reflected power while reflecting no co-pol field over a certain range of wavelengths or vice-versa. This will be useful to increase power efficiency in, for example, wave power sources that utilize quasi-optical power by causing oscillations in reflection amplifier arrays.

A Frequency Selective Surface (FSS) is any surface that scatters polarized plane waves in specific ways. Some FSSs act as filters that pass frequencies within some bandwidth and reflect other frequencies. The FSSs of interest to the present application ideally provide 100% reflection to linearly polarized plane waves of one polarization and provide 100% transmission to the orthogonally polarized waves. The embodiments of the invention will be described for a grating but a meandering circuit trace could also be configured as a FSS. Furthermore the embodiments of the invention will be described for the typical case of normally-incident linearly-polarized plane waves. However, the partial reflector could be configured for use with obliquely incident plane waves and/or arbitrarily polarized plane waves, which would require some changes to the physical design of the gratings, spacing of the gratings and the characteristic equations given below for the partial reflector. Such modifications would be well understood by those of ordinary skill in the art.

Figure 1:
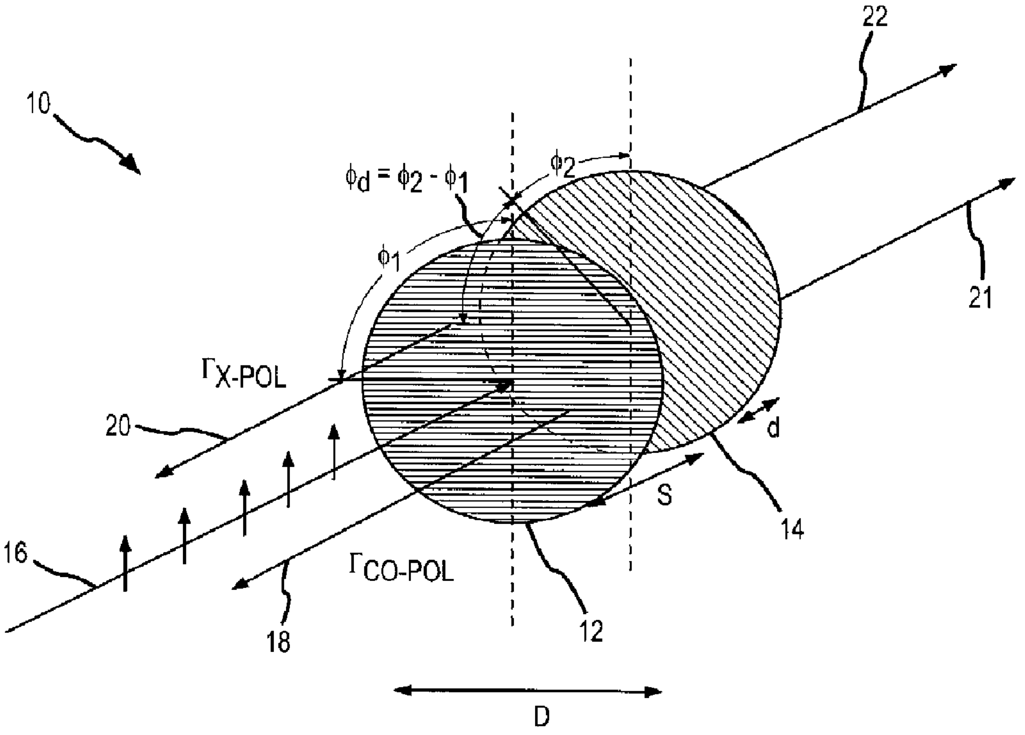
FIG. 1 is a diagram of a variable cross-coupling partial reflector in accordance with the present invention.

As illustrated in FIG. 1, a variable cross-coupling partial reflector 10 consists of a pair of polarization gratings 12 and 14. Reflector 10 is illuminated with a linearly polarized plane wave 16 and reflects a co-pol field 18 and x-pol field 20 and transmits co- and cross-polarized fields 21 and 22, respectively. The co-pol and x-pol are defined with respect to the incident polarization. Each of the gratings substantially reflects waves that have a polarization that lies along the grating and substantially transmits waves that are polarized orthogonally to the grating. By orienting the two gratings properly at angles $\phi_1$ with respect to the incident polarization and $\phi_d$ with respect to $\phi_1$, one can achieve specific amounts ($\Gamma_{co\text{-}pol}$, $\Gamma_{x\text{-}pol}$) of co- and x-pol reflection in fields 18 and 20 normalized to the incident plane wave magnitude. The remaining energy is transmitted through the device in fields 21 and 22 with a small amount of attenuation in the reflector.

To implement the partial reflector, one must design a suitable grating. The parameters of the grating include tine width, tine spacing, grating thickness d and grating diameter D. Typically, the center-to-center tine spacing is chosen to be less than one wavelength λ0 at the highest frequency of operation, typically ~0.5 λ. The tine width is typically ~0.5 the tine spacing. Smaller is better, but more difficult to fabricate. The grating thickness d is the most sensitive parameter and is chosen ~0.5 λ so that reflection from the front and back surfaces of the grating cancel one another. To choose the thickness, the grating is simulated using an EM solver and the thickness is selected to cancel the reflected fields for an incident polarization that is orthogonal to the direction of the grating tines. The polarization gratings are designed with a diameter D that is large enough for the application of interest. In practice, D will typically range from a few wavelengths to many hundreds of wavelengths.

The spacing 's' of the gratings is also an important parameter. An s~¼ λ spacing (or odd multiples thereof) is optimal to maximize the range of reflection coefficients over which the co-pol and x-pol fields can be tuned and is less sensitive to errors in spacing. The spacing may deviate from the optimum and still function adequately but the spacing can not (ideally) be a multiple of ½ λ. Assuming ideal gratings, at ½ λ multiple reflections between the gratings produce 100% co-pol reflection of the incident plane wave, independent of the grating angles.

Assuming ideal gratings and a normally incident linearly polarized plane wave, the relationship between ($\phi_1$, $\phi_d$) and ($\Gamma_{x\text{-}pol}$, $\Gamma_{co\text{-}pol}$) is given by:

$$\phi_1 = \cot^{-1}\left(\frac{\Gamma_{x-pol}}{1+\Gamma_{co-pol}}\right), \quad (1)$$

and $$\phi_d = \cos^{-1}\left(\sqrt{\frac{\cos\left(2\left(\phi_1 - \frac{\pi}{2}\right)\right) - \Gamma_{co-pol}}{1+\Gamma_{co-pol}}}\right). \quad (2)$$

Equations (1) and (2) will provide angles ($\phi_1$, $\phi_d$) that for well designed and properly constructed gratings and a substantially normal plane wave will produce actual reflected cross-polarized and co-polarized fields within a "reasonable approximation" of the ideal values, e.g. no worse than a 3 dB deviation. The gamma values are often expressed in dB but should be in numeric form when entered into the equations. $\Gamma_{numeric}=\exp(\Gamma_{dB}/2)$.

Figure 2:
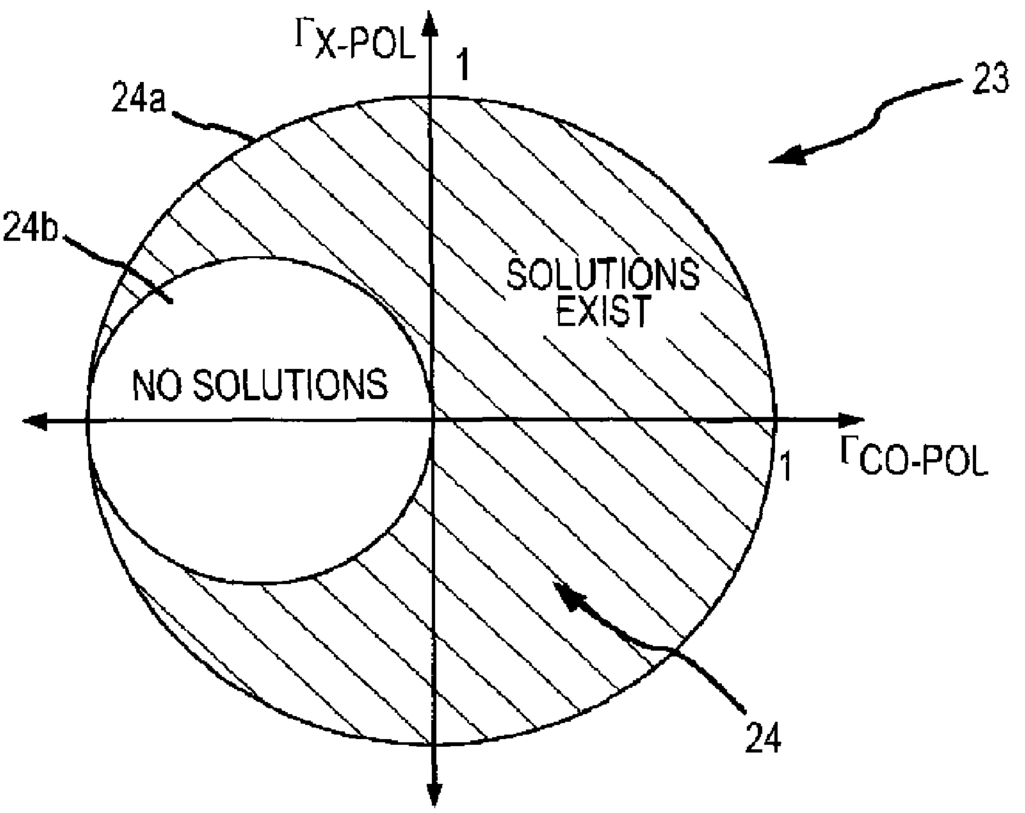
FIG. 2 is a plot of the possible values of $\Gamma_{x\text{-}pol}$, $\Gamma_{co\text{-}pol}$ that can be realized with the variable cross-coupling partial reflector, assuming a $\lambda/2$ tine thickness and $\lambda/4$ grating spacing.

The angles $\phi_1$, $\phi_d$ can be selected to achieve any desired amounts $|\Gamma_{x\text{-}pol}|$, $|\Gamma_{co\text{-}pol}|$ of the x-pol and co-pol field magnitudes. Using the described approach, the phases of the co- and x-pol fields are always equal to the incident field (with a possible phase reversal). Thus, the possible values of $\Gamma_{x\text{-}pol}$, $\Gamma_{co\text{-}pol}$ that can be realized using this invention can be plotted on a 2D graph 23 as shown in FIG. 2. The outer perimeter 24*a* is bounded by the circle $|\Gamma_{co\text{-}pol}|^2+|\Gamma_{x\text{-}pol}|^2<1$, which is the result of power conservation. The inner perimeter 24*b* is bounded by the circle $|\Gamma_{co\text{-}pol}+0.5|^2+|\Gamma_{x\text{-}pol}|^2>0.25$. This is a result of the constraints that were imposed on the structure, namely gratings that either perfectly reflector or perfectly transmit, quarter wave spacing, half wavelength tines, etc. This limitation does not pose any problems in practice since most applications are concerned only with reflected magnitudes of components and not phase values. The area between the inner and outer inner perimeters defines the set of allowable solutions 25 as indicated by the shaded area in FIG. 2.

The cases in which the co-pol reflected component is nulled are of particular interest in quasi-optical wave sources.

Case 1: $\Gamma_{co\text{-}pol}=0$

In this case the first grating is rotated by $\phi_1=\cot^{-1}(\Gamma_{x\text{-}pol})$ and the second grating by an amount $$\phi_d = \cos^{-1}\left(\sqrt{\cos\left(2\left(\phi_1 - \frac{\pi}{2}\right)\right)}\right)$$

with respect to the first grating. In accordance with equation 1, $\phi_1$ will range from 45° for a maximum value of $\Gamma_{x\text{-}pol}$ corresponding to 100% reflection to 90° for a minimum value of $\Gamma_{x\text{-}pol}$ corresponding to 0% reflection. More typically, $\Gamma_{x\text{-}pol}$ will range for −3 dB (e.g. 50% reflected power) to about −15 dB, e.g. anything less than −20 dB is essentially zero. In accordance with equation 2, $\phi_d$ will range from 90° for maximum x-pol reflection (e.g. 135° from the incident polarization) to 0° for minimum x-pol reflection (e.g. 90° from the incident polarization).

Another case is where the cross-pal reflected component is nulled.

Case 2: $\Gamma_{x\text{-}pol}=0$

In this case the first grating is rotated by $$\phi_1 = \frac{\pi}{2}$$

and the second grating by an amount $$\phi_d = \cos^{-1}\left(\sqrt{\frac{1-\Gamma_{co}}{1+\Gamma_{co}}}\right)$$

with respect to the first grating. In accordance with equation 1, $\phi_1$ is fixed for all values of co-pol reflection. In accordance with equation $2\phi_d$ will range from 90° for maximum x-pol reflection (e.g. 135° from the incident polarization) to 0° for minimum x-pol reflection (e.g. 90° from the incident polarization).

The derivation of equations (1) and (2) for the partial reflector is based on the calculation of the scattering matrix for the structure. We assume that the gratings that make up the structure have been designed appropriately so that they only reflect a single Floquet mode, i.e. no grating lobes are generated. This will be the case when the grating tines are spaced less then λ/2 apart center to center. We also assume that the gratings are designed so that the component polarized along the tines reflects perfectly (in reality there will be a small inductive phase shift) and the orthogonal component will transmit perfectly (this is accomplished using a λ/2 depth of the tines, with a small correction made for fringing capacitance).

Figure 3:
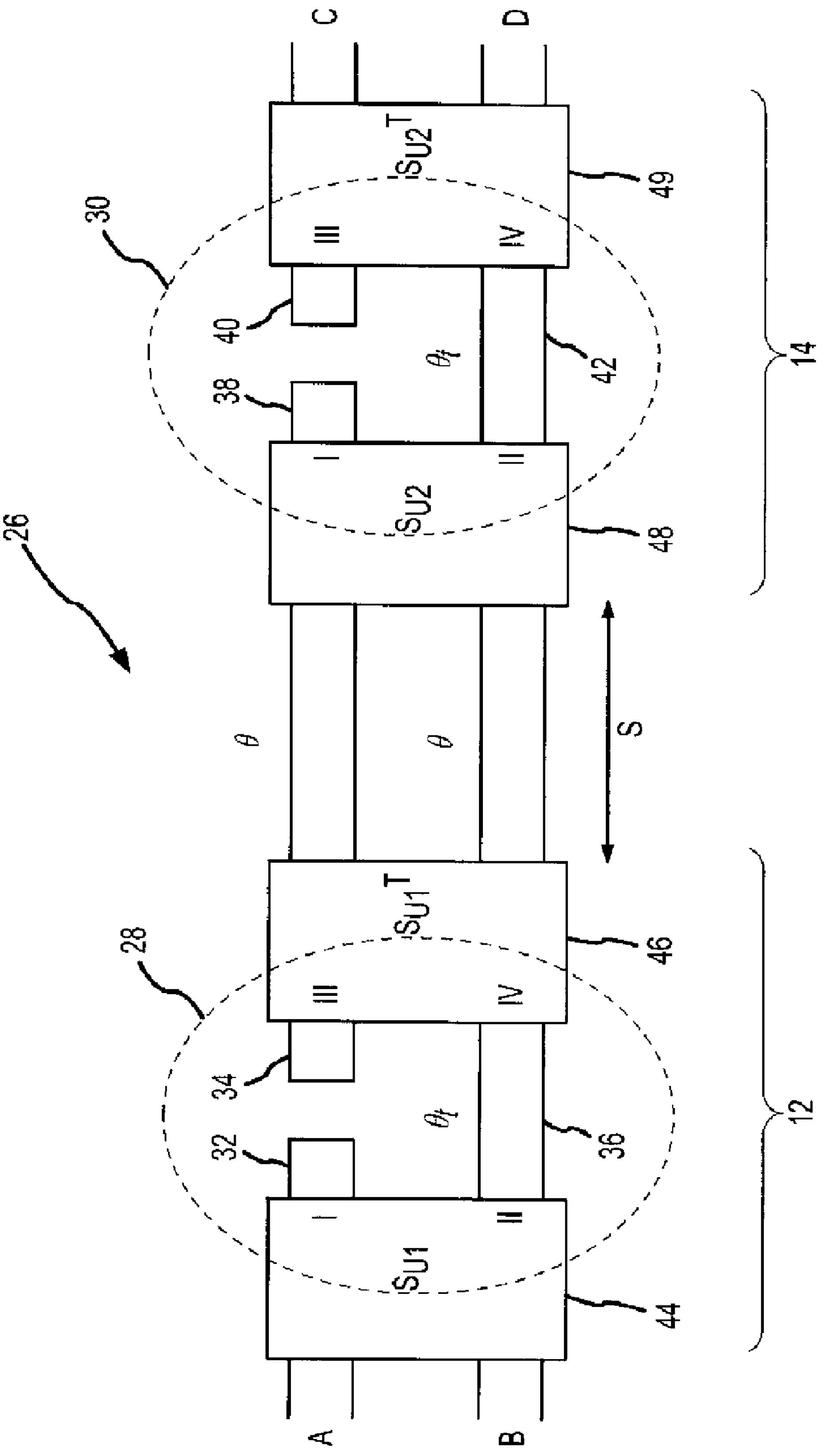
FIG. 3 is a four-port network equivalent circuit for the partial reflector.

An equivalent four-port network 26 for the partial reflector is shown in FIG. 3. Port A is co-pol 18 on the input (left) side of the structure, port B is x-pol 20 on the input, port C is co-pol 21 on the output (right), and port D is x-pol 22 on the output. Elements of the structure are represented by four-port networks 28, 30 described by their S parameters. The derivation will proceed from the center network that represents the spacing s between the gratings and work its way outward. Grating 12 is represented by short circuits 32 and 34 at ports I and III, and a λ/2 transmission line 36 connecting ports II and IV of a four port network 28. Similarly, grating 14 is represented by short circuits 38 and 40 at ports I and III, and a λ/2 transmission line 42 connecting ports II and IV of a four-port network 30. This representation assumes that the port polarizations have been defined in terms of polarizations along the tines for ports I and III and orthogonal to the tines for ports II and IV. In reality, the gratings are rotated, and the effects of the rotations are included using "rotation networks" 44, 46, 48 and 49. Each grating has a rotation network on each side, so that waves passing from either side have their polarizations rotated to the new basis set for the grating. Details are given in J. J. Lynch, J. S. Colburn. "Modeling Polarization Mode Coupling in Frequency Selective Surfaces," *IEEE Trans. on Microwave Theory and Techniques*, Vol. MTT-52. No. 4, pp 1328-1338, April 2004.

The S par matrix for the spacing s between the gratings is $S_1$ $$S_t = \begin{pmatrix} 0 & I \\ I & 0 \end{pmatrix} e^{-j\theta},$$

where θ is the electric length of the spacing (90 degrees for λ/4) and I is the identity matrix $$I = \begin{pmatrix} 1 & 0 \\ 0 & 1 \end{pmatrix} \text{ and } 0 = \begin{pmatrix} 0 & 0 \\ 0 & 0 \end{pmatrix}$$

is the null matrix. The use of submatrices simplifies the calculations. The rotation matrices for the right side of the left grating 12 and the left side of the right grating 14 are given, respectively, by $$S_{u_1^T} = \begin{pmatrix} 0 & U_1^T \\ U_1 & 0 \end{pmatrix} \text{ and } S_{u_2} = \begin{pmatrix} 0 & U_2 \\ U_2^t & 0 \end{pmatrix},$$

$$\text{where } U_{1.2} = \begin{pmatrix} \cos(\phi_{1.2}) & \sin(\phi_{1.2}) \\ -\sin(\phi_{1.2}) & \cos(\phi_{1.2}) \end{pmatrix}.$$

The scattering matrix for the spacing 's' plus the two rotation matrices is given by $$S_{t'} = \begin{pmatrix} 0 & U_1^t U_2 \\ U_2^T U_1 & 0 \end{pmatrix} e^{-j\theta} = \begin{pmatrix} 0 & U_d \\ U_d^t & 0 \end{pmatrix} e^{-i\theta}, \text{ where}$$

$$U_d = \begin{pmatrix} \cos(\phi_d) & \sin(\phi_d) \\ -\sin(\phi_d) & \cos(\phi_d) \end{pmatrix},$$

and $\phi_d=\phi_2-\phi_1$ where $\phi_2$ is the rotation of grating 14 with respect to the incident polarization.

The next step is to apply short circuits to ports I and III of the network described by $S_1$. The result is a 2 port network, with S parameters given by $S_{2p}=S_a+S_b{}^1(\Gamma^{-}-S_a)^{-}S_b$, where $$S_a = \begin{pmatrix} 0 & 1 \\ 1 & 0 \end{pmatrix} \cos(\phi_d) e^{i\theta},\ S_b = \begin{pmatrix} 0 & 1 \\ -1 & 0 \end{pmatrix} \sin(\phi_d) e^{-j\theta},$$

and 132 −1. After some algebraic manipulation, the resulting 2-port matrix is found to be $$S_{2p} = \begin{pmatrix} S_{2p.11} & S_{2p.12} \\ S_{2p.12} & S_{2p.11} \end{pmatrix}, \text{ where } S_{2p.11} = -\frac{\sin^2(\phi_d)e^{-j2\theta}}{1-\cos^2(\phi_d)e^{-j2\theta}} \text{ and}$$

$$S_{2p.12} = \cos(\phi_d)e^{-j\theta}\left(\frac{1-e^{-j2\theta}}{1-\cos^2(\phi_d)e^{-j2\theta}}\right).$$

These ports must be rotated through an angle $\theta_t$ that represents the thickness of the tines (nominally λ/2). This inserts a factor $e^{-j20}$ to each of the 2 port S parameters above. Next, the four port network 26 is created by adding short circuits to ports I and III and using the above 2 port between ports II and IV. The resulting scattering matrix is:

$$S_{4p}=\begin{pmatrix}-1&0&0&0\\0&S_{2p.11}e^{-j2\theta_i}&0&S_{2p.12}e^{-j2\theta_i}\\0&0&-1&0\\0&S_{2p.12}e^{-j2\theta_i}&0&S_{2p.11}e^{-j2\theta_i}\end{pmatrix}.$$

The final step is to rotate the polarizations back to the incident polarizations. This is accomplished by including the last 2 rotation networks in the computations. The resulting scattering matrix is $$S'=\begin{pmatrix}U_1S_{4p.11}U_1^T&U_1S_{4p.11}U_2^T\\U_2S_{4p.12}U_1^T&U_2S_{4p.12}U_2^T\end{pmatrix},$$

where the submatrices are given by $$U_1S_{4p.11}U_1^T=\begin{pmatrix}\cos(\phi_1)&\sin(\phi_1)\\-\sin(\phi_1)&\cos(\phi_1)\end{pmatrix}\begin{pmatrix}-1&0\\0&S_{2p.11}e^{-j2\theta_i}\end{pmatrix}\begin{pmatrix}\cos(\phi_1)&-\sin(\phi_1)\\\sin(\phi_1)&\cos(\phi_1)\end{pmatrix}$$

$$=\begin{pmatrix}-\cos^2(\phi_1)+S_{2p.11}e^{-j2\theta_i}\sin^2(\phi_1)&(1+S_{2p.11}e^{-j2\theta_i})\sin(\phi_1)\cos(\phi_1)\\(1+S_{2p.11}e^{-j2\theta_i})\sin(\phi_1)\cos(\phi_1)&-\sin^2(\phi_1)+S_{2p.11}e^{-j2\theta_i}\cos^2(\phi_1)\end{pmatrix},\text{ etc.}$$

Since we are primarily interested in the reflections from the left (input) side of the structure, the remaining three submatrices need not be computed.

At the center frequency of operation, we will assume the spacing is λ/4 (i.e., θ=π/2) and the thickness of the tines is λ/2 (i.e., $\theta_t$=π). For this case, the co-pol reflection is given by:

$$\Gamma_{co-pol}=-\cos^2(\phi_1)+\frac{\sin^2(\phi_d)}{1+\cos^2(\phi_d)}\sin^2(\phi_1)$$

and the x-pol reflection by:

$$\Gamma_{x-pol}=\left(1+\frac{\sin^2(\phi_d)}{1+\cos^2(\phi_d)}\right)\sin(\phi_1)\cos(\phi_1)=\frac{\sin(2\phi_1)}{1+\cos^2(\phi_d)}.$$

Note that these reflection coefficients are real due to our choice of λ/2 tine thickness and λ/4 grating separation. These expressions can be manipulated to produce the final result given in equations (1) and (2) above. In practice the amounts of rotation will not be exactly equal to the expressions given above due to the non-ideal nature of physical gratings. But for gratings that are designed well and exhibit high reflection with phase reversal for polarization along the grating and high transmission with no additional phase delay (except possibly phase reversal), the expressions given above will be fairly accurate.

Figure 4A:
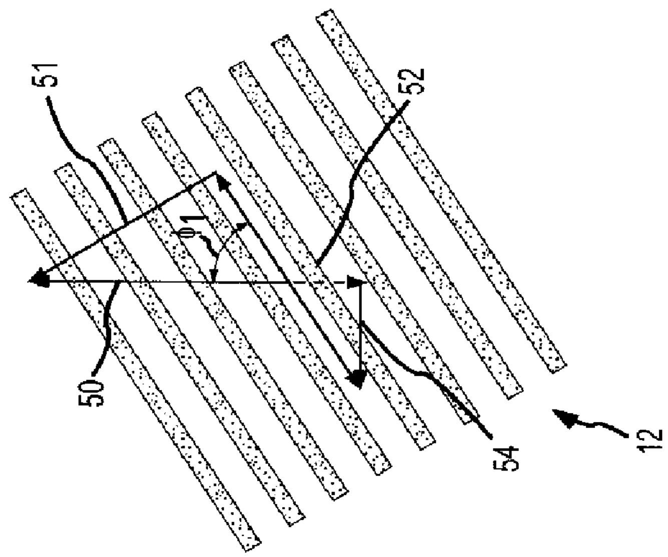
FIGS. 4*a*-4*c* are a sequence of grating diagrams illustrating the physical operation of the partial reflector.
Figure 4B:
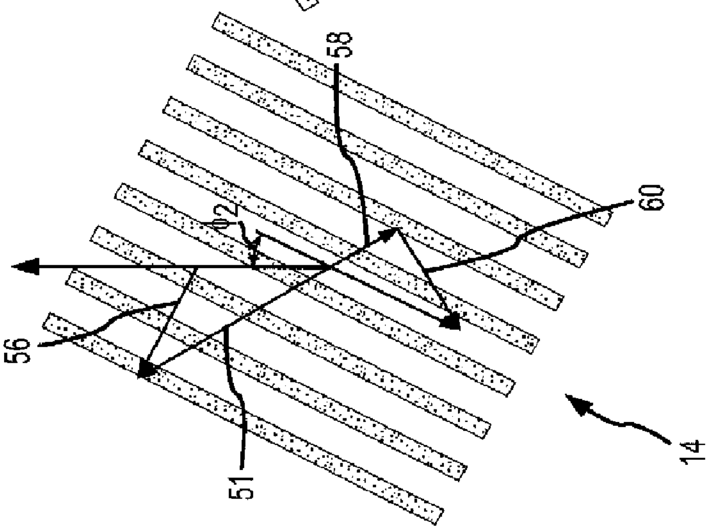
Figure 4C:
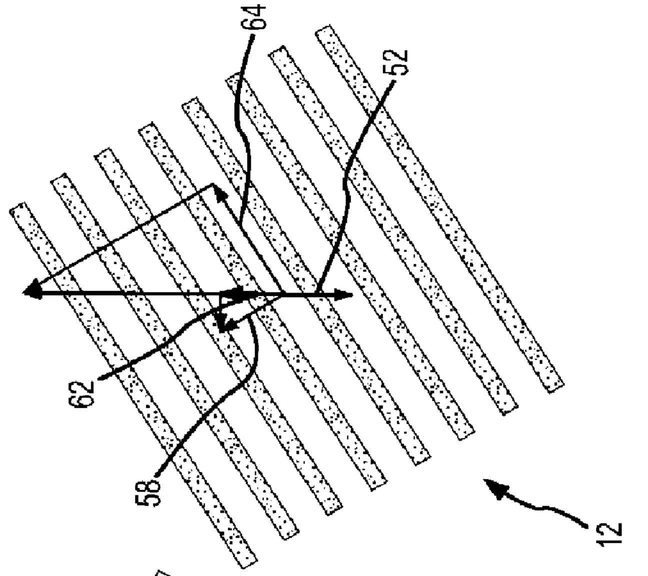

A physical explanation of the operation of the partial reflection is described with reference to FIGS. 4*a*-4*c* for a special case in which the reflected x-pol component is set at a specific amount and the reflected co-pol component is nulled to zero. The principles apply to any specified amounts for both the co- and x-pol components. FIG. 4*a* shows a normally-incident linearly polarized plane wave Einc 50 incident on the first grating 12 at an angle $\phi_1$. A portion 51 of incident wave 50 is transmitted through the grating and some is reflected back. The reflected wave can be decomposed into co-pol 52 (dashed) and x-pol 54 components with respect to the incident field. Note that the reflected component is flipped (phase reversal) upon reflection. The second grating 14 is rotated by $\phi_d$ to cancel the co-pol component 52. FIG. 4*b* shows the transmitted wave 51 incident upon the second grating, which is rotated with respect to the first. A portion 56 of this wave is transmitted through, and part is reflected back (with a phase reversal). This reflected wave can be decomposed into a component 58 (dashed) across the first grating and a component 60 along the first grating. As shown in FIG. 4*c*, the wave component 58 across the first grating 12 is transmitted through with a phase reversal due to the net half wavelength distance traveled between gratings. Wave component 58 can be decomposed into co-polarization component 62 (bold) and a x-pol component 64 with respect to the original incident wave. The rotation angle of the second grating is chosen so that the (bold) co-pol component 62 exactly cancels the original (dashed) co-pol component 52 reflected from the first grating by the incident wave. In this way the device reflects only x-pol component 54. The description is only approximate since it neglects multiple reflections between the gratings, but serves to give physical insight into how this device operates. The formulas given above for the co-pol and x-pol reflections are more accurate since they take multiple reflections into account.

Although the formulas are reasonably accurate for well designed gratings and typical system applications it may be desirable to "tweak" the rotation of gratings to improve accuracy. Conceivably this could be done in a few different ways. A system or operator could forgo the equations altogether and just rotate the gratings until the desired amount of the co- and x-pol fields was realized. Typically, one would adjust the first grating to approximately set the larger field, adjust the second grating to approximately set the smaller field and than make fine adjusts. Alternately, one could use the equations to set the initial rotation of the gratings and than make fine adjustments. Both approaches assume that (a) the system has the capability to measure the reflected field components, (b) the ability to rotate both gratings and (c) the time to perform the calibration. Another approach is use the equations and perform the fine adjusts off-line and store the angles for specific co- and x-pol fields in a look-up table (LUT). The LUT can than be used to provide the angles for a fixed implementation of the partial reflector or can be provided to a system controller as part of a variable implementation of the partial reflector.

Figure 5:
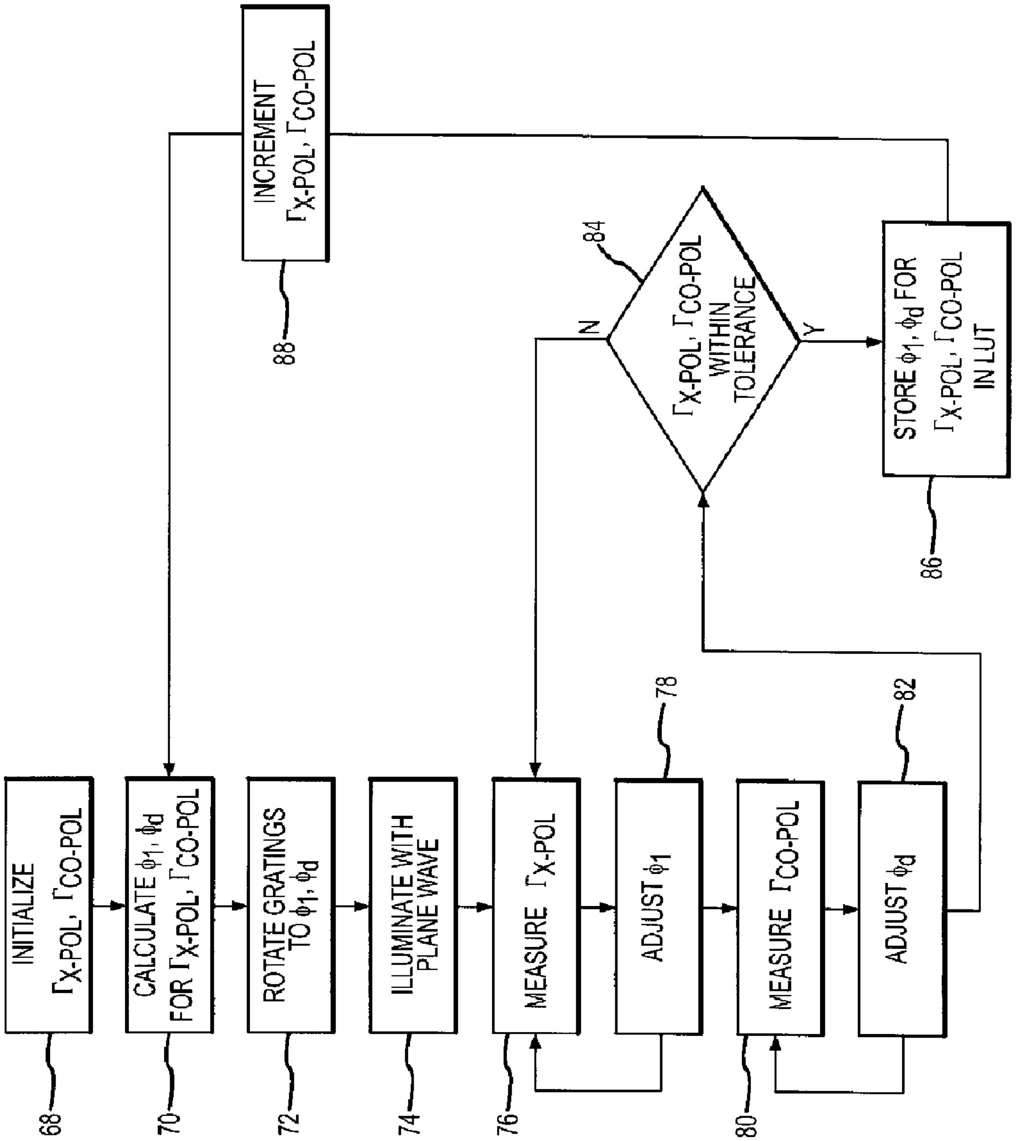
FIG. 5 is a flow diagram of an embodiment for characterizing the partial reflector and storing the ($\phi_1$, $\phi_d$) pairs for specified ($\Gamma_{x\text{-}pol}$, $\Gamma_{co\text{-}pol}$) pairs in a look-up table (LUT)

One method of programming the LUT is illustrated in FIG. 5. The LUT of angle pairs $\phi_1$, $\phi_t$ is programmed for a range of $\Gamma_{x-pol}$, $\Gamma_{co-pol}$ and a desired resolution. For example, $\Gamma_{x-pol}$, $\Gamma_{x-pol}$ could be (−3 dB to −15 db, −3 dB to −15 dB) by increments of 0.1 dB, In another embodiment $\Gamma_{x-pol}$, $\Gamma_{co-pol}$ could be (−3 dB to −15 db, 0) by increments of 0.1 dB, The amounts $\Gamma_{x\text{-}pol}$, $\Gamma_{co\text{-}pol}$ are set to initial values (step 68) and the corresponding angles $\phi_1$, $\phi_d$ are calculated (step 70). Note, at this point the angles could be programmed into the LUT without further adjustment. In this embodiment, the gratings are rotated to the calculated $\phi_1$, $\phi_d$ (step 72) and the first grating is illuminated with a linearly polarized plane wave (step 74). One component, suitably the largest and in this case the x-pol field, is measured (step 76) and $\phi_1$ is adjusted until the measured amount of $\Gamma_{x\text{-}pol}$ is the specified amount for the table (step 78). Similarly the other component, suitably the smaller and in this case co-pol field, is measured (step 80) and $\phi_d$ is adjusted until the measured amount of $\Gamma_{co\text{-}pol}$ is the specified amount for the table (step 82). Because the adjustment of $\phi_d$ may affect $\Gamma_{x\text{-}pol}$ the components are remeasured and the process is repeated until $\Gamma_{x\text{-}pol}$, $\Gamma_{co\text{-}pol}$ are within a specified tolerance (step 84). At that point, $\phi_1$, $\phi_d$ are stored in the LUT for the specified values of $\Gamma_{x\text{-}pol}$, $\Gamma_{co\text{-}pol}$ (step 86), $\Gamma_{x\text{-}pol}$, $\Gamma_{co\text{-}pol}$ are incremented (step 88) and the process is repeated until the LUT is programmed.

Figure 6A:
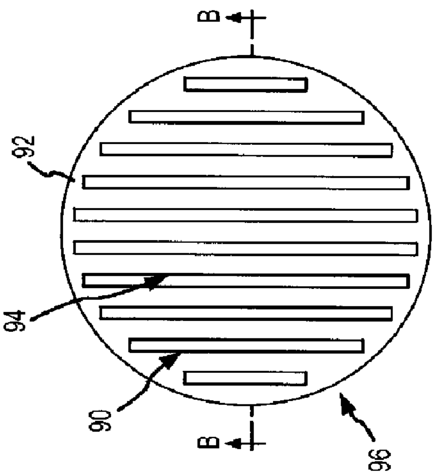
FIG. 6 is a section view of an embodiment of the partial reflector in which a series of metal bars of rectangular cross section are cut through a plate.
Figure 6B:
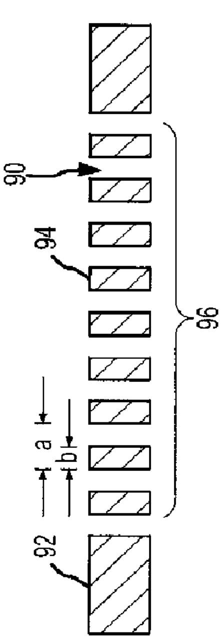

There are many ways to physically realize the grating structures. In one embodiment shown in FIGS. 6*a* and 6*b*, a series of rectangular openings 90 are cut through a plate 92 to form a series of metal tines 94 having rectangular cross section, which together form a grating 96. The period of the grating "a" is chosen to be ~λ/2 to avoid spurious lobes from the grating. The width of the tine "b" is typically chosen to be ~λ/4. Smaller tines give better performance, but are more difficult to realize, especially at high frequencies. The thickness of the tines "d" is typically ~λ/2 to minimize reflections of waves polarized perpendicular to the grating. This structure is especially appealing because it offers minimal material loss to waves that are transmitted or reflected from it.

Another method of realizing the gratings is to utilize photolithographic printed circuit board methods to etch a metal pattern in a planar dielectric material. The circuit boards are spacing about a quarter of a wavelength apart, and each of the circuit boards is about half a wavelength thick. If mechanical support is needed between the boards, one could insert a spacer layer, with a thickness of about a quarter of a wavelength in the spacer material, rather than having air between the circuit hoards. For practical structures the grating period should be about one quarter to three quarters of a wavelength, and the strip width should be between one eighth and one half of the period. Due to parasitic effects of the printed circuit gratings, the optimum rotation angles will be slightly different than those given above, but not much different for most practical structures. If variable reflectivity is not needed, specific amounts of $\Gamma_{x\text{-}pol}$, $\Gamma_{co\text{-}pol}$ can be achieved with a single dielectric sheet that has two grating patterns, each at a specific angle relative to the incident polarization, by etching the grating patterns on both sides of the dielectric. For this structure the dielectric should be about a quarter wavelength thick in the dielectric material.

Figure 7A:
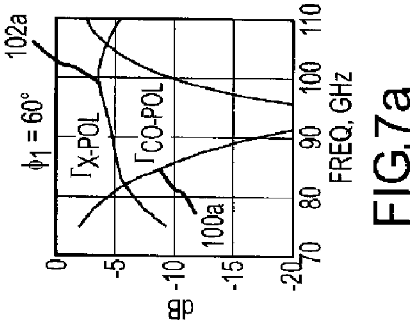
FIGS. 7*a*-7*c* are plots of the co- and cross-pol reflective field magnitudes normalized to the incident field magnitude in which the desired cross-pol varies from −5 to −15 dB and the desired co-pol is set to zero for a given bandwidth.
Figure 7B:
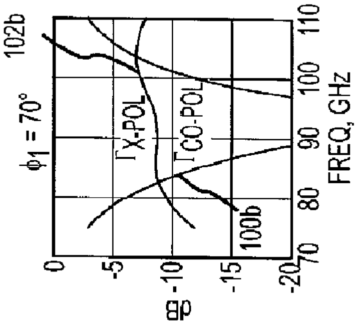
Figure 7C:
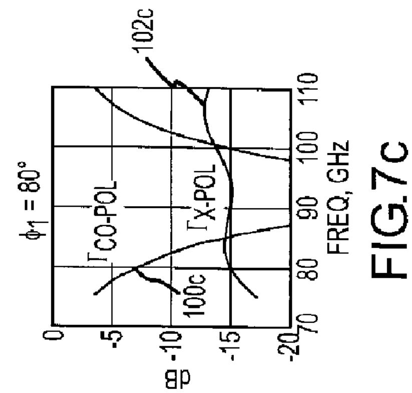

FIGS. 7*a*-7*c* show calculations of the co-pol and x-pol reflected field magnitudes 100*a*, 100*b*, 100*c* and 102*a*, 102*b* and 102*c*, normalized to the incident field magnitude, where the first grating is rotated by 60°, 70° and 80° and the second grating is rotated to null the co-pol field. The reflected x-pol field is approximately constant and the co-pol field is less than −20 dB over an approximately 10 GHz bandwidth centered on an operating frequency of 95 GHz. The electromagnetic scattering from the grating was computed using Ansoft's HFSS finite element simulator, and the results were used to compute the response including the rotations of the first and second gratings. The dimensions of the grating are: a=1.27 mm, b=0.635 mm, d=1.36 mm. At 95 GHz, λ=3.16 mm. The dimension "d" was chosen to minimize reflections for polarizations orthogonal to the bars. It is slightly less than λ/2 due to the effects of fringing capacitance at the edges of the bars.

Figure 8:
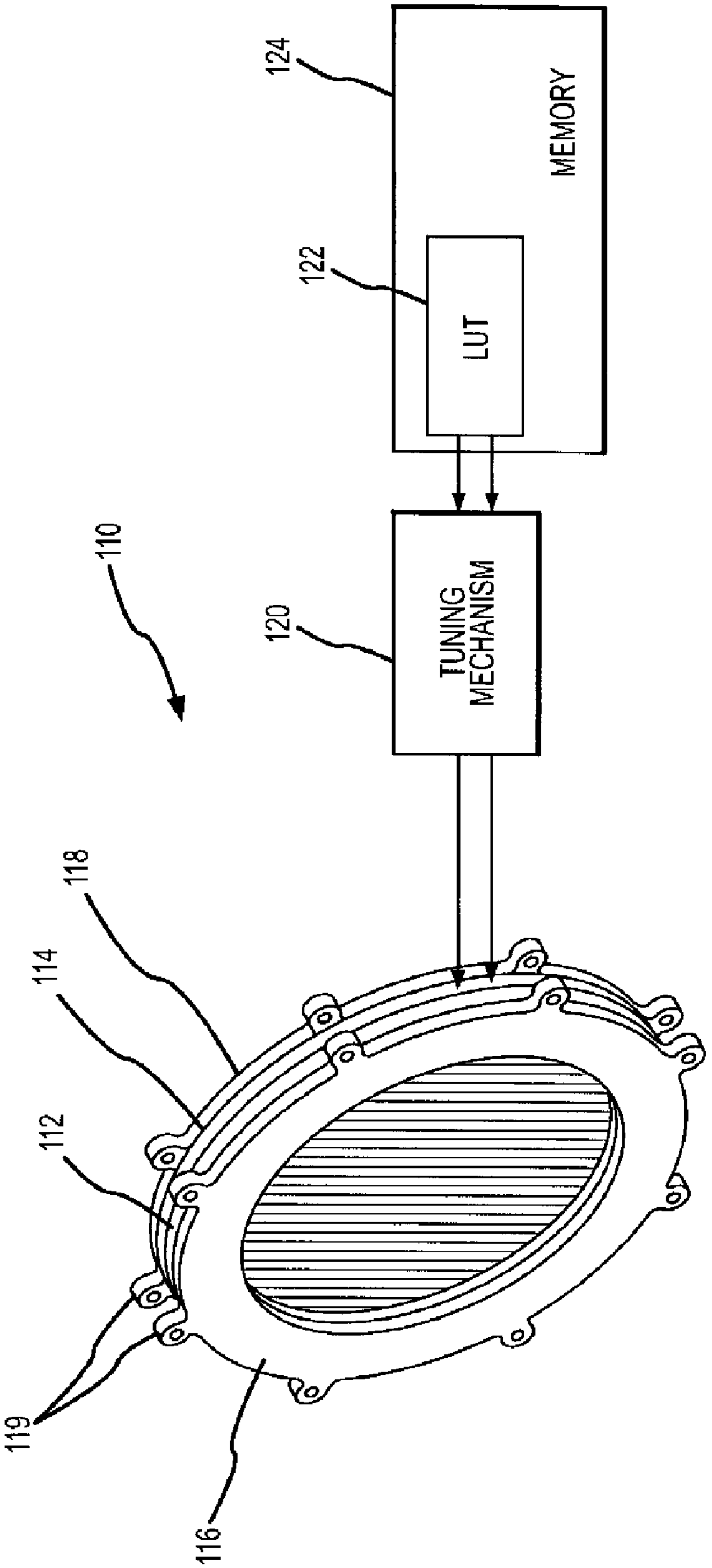
FIG. 8 is a diagram of a partial reflector including a pair of planar dielectric gratings formed on respective circuit boards and a tuning mechanism for rotating each grating.

As shown in FIG. 8, a mechanically tunable reflector 110 includes a pair of inner grating plates 112 and 114, each with a grating formed therein. The plates are spaced approximately__¼ apart and held in place by outer anchor plates 116 and 118 and screws (not shown) through outer flanges 119. Ball hearing races (not shown) between the inner grating plates and the outer anchor plates allow the inner grating plates to rotate freely. A tuning mechanism 120 such as a pair of stepper motors independently rotates each grating to a desired angle. In this embodiment, the relationship between ($\phi_1$, $\phi_d$) and ($\Gamma_{x\text{-}pol}$, $\Gamma_{co\text{-}pol}$) is stored in a LUT 122 in memory 124. The system or an operator specifics $\Gamma_{x\text{-}pol}$, $\Gamma_{co\text{-}pol}$ and the LUT outputs the corresponding ($\phi_1$, $\phi_d$) to tuning mechanism 120. Depending on the granularity of the LUT and the system requirements, the closest pair can be used or a simple interpolation can be performed to improve the precision of the angles.

Figure 9:
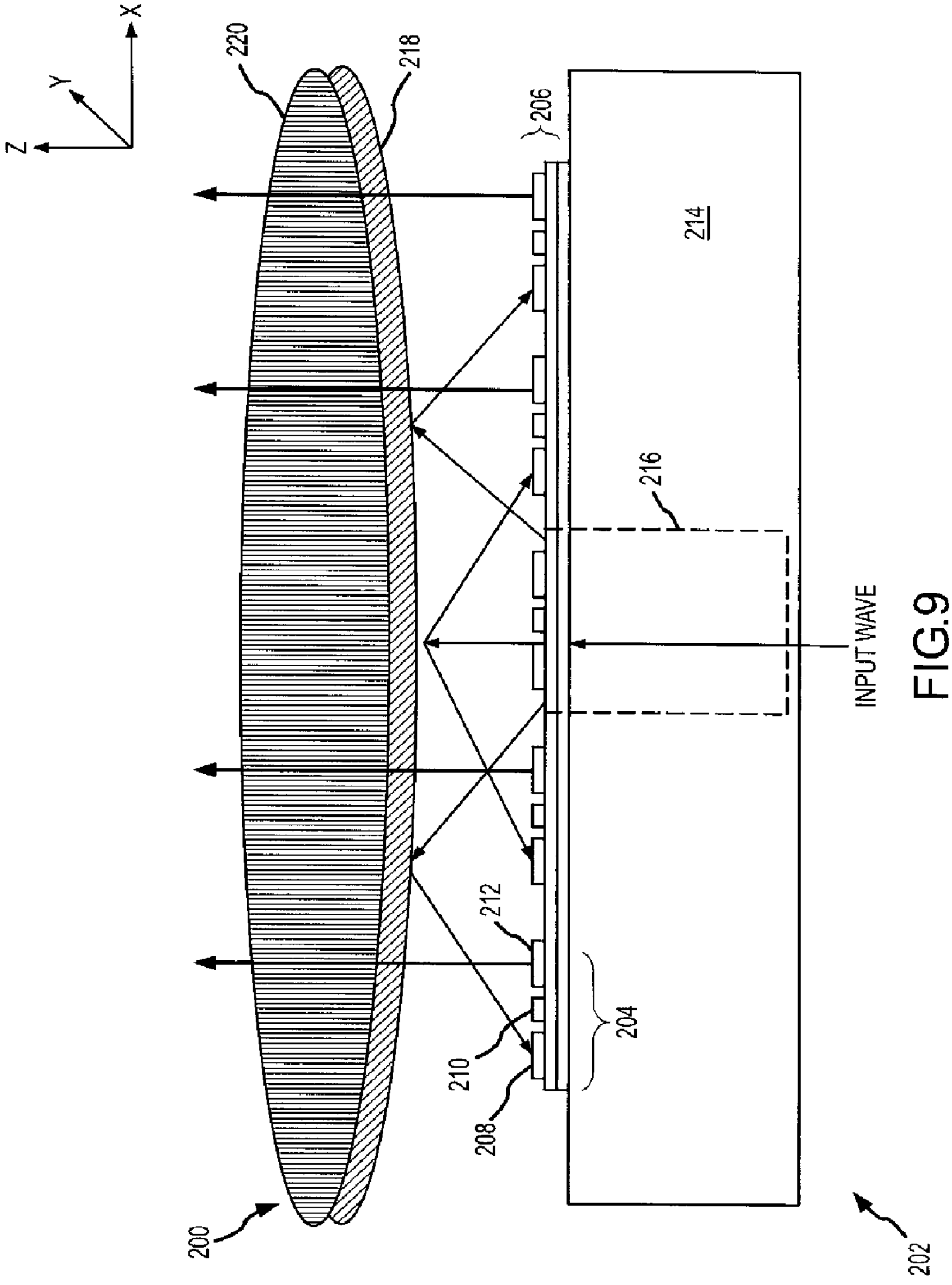
FIG. 9 is a section view a quasi-optical amplifier/oscillator array using the variable cross-coupling partial reflector.
Figure 10:
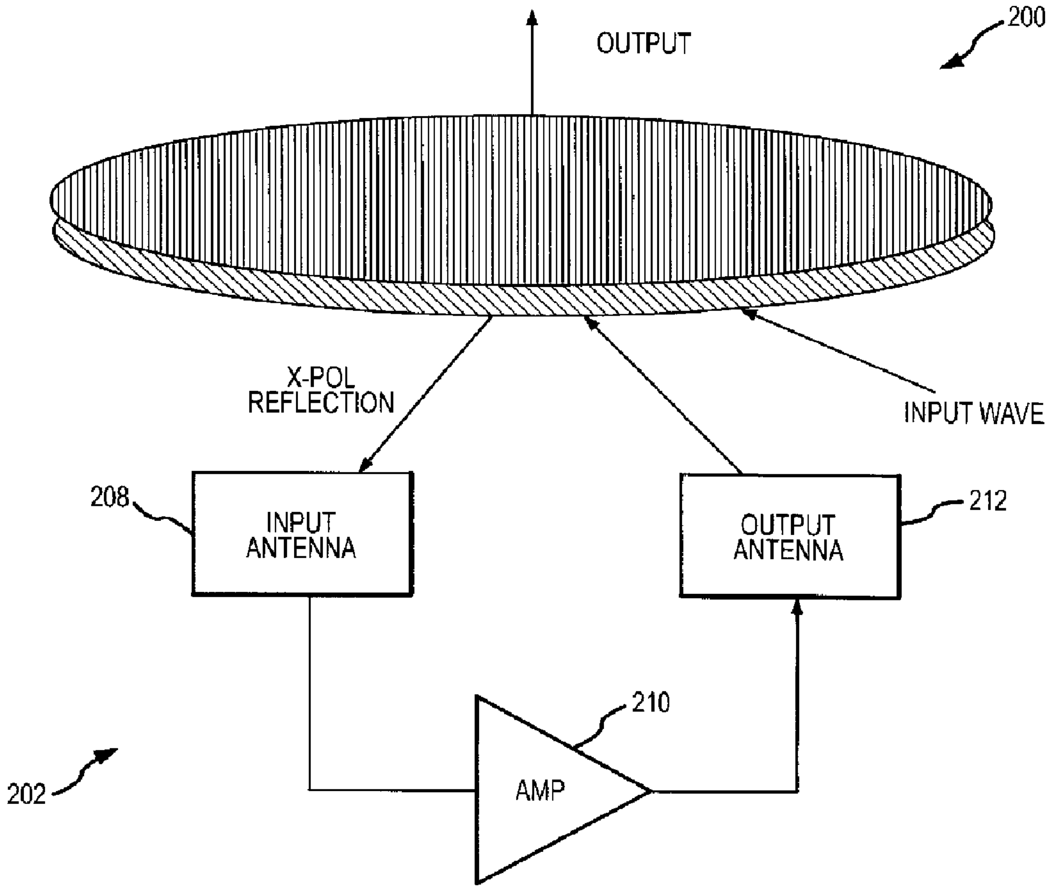
FIG. 10 is a diagram of one element of the quasi-optical amplifier/oscillator array.

As shown in FIGS. 9 and 10, a variable cross-coupling partial reflector 200 can be incorporated into a quasi-optical electromagnetic array structure 202 to generate high power either as a source or as an amplifier at millimeter wave frequencies depending on the amount of array coupling. The variable cross-coupling partial reflector can provide the desired reflected x-pol field to provide amplification or oscillation while nulling the co-pol field to improve power efficiency of the source.

The structure utilizes amplification devices 204 with cross input/output polarizations arranged in an array 206. The amplification device includes an input antenna 208 polarized in the X direction, an amplifier 210, and an output antenna 212 polarized in the Y direction. The array of amplification devices are disposed on a heatsink layer 214 with a waveguide 216 coupled to the array for coupling in the input wave. The waveguide 216 is needed only for the amplifier or amplifier/oscillator configurations but not for an oscillator only configuration. Partial reflector 200 is rotationally disposed above the array so that its first and second gratings 218 and 220 may rotate independently.

By configuring the partial reflector 200 to reflect 100% of the co-polarized energy in the X direction and to transmit 100% of the cross-polarized energy in X direction, the structure operates as a high power amplifier. The energy from an opening of the waveguide 216 is reflected off of the partial reflector, absorbed by the input antennas 208, amplified by amplifier 210 and reradiated by the output antennas 212 in the cross polarization Y direction, which allows it to pass mostly unaffected through the partial reflector. To achieve this both gratings are suitably aligned parallel with the polarization of the input antenna in the X direction.

By configuring the partial reflector 200 to reflect a specified amount of cross-polarized energy in the X direction, the structure operates as an oscillator. Some of the output energy is converted into cross-polarized modes, thus coupling together the amplifier inputs and outputs. If the cross-polarized coupling is increased beyond a certain threshold, the amplification is high enough to overcome losses in the system and the round trip phase is close to zero, the feedback will cause the amplification devices to oscillate. Configuring the partial reflector to null the co-polarized energy in the Y direction will improve the power efficiency of the structure.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A cross-coupling partial reflector, comprising:

a first frequency selective surface (FSS) rotated by a first angle with respect to the polarization of an incident plane wave, and a second FSS spaced behind the first FSS and rotated by a second angle with respect to the first FSS, said first and second FSSs substantially reflective to polarized waves of one polarization and substantially transmissive to the orthogonally polarized waves, said first and second FSSs reflecting the incident plane wave so that the magnitude of a net reflection has approximately a specified amount of a cross-polarized field of the plane wave and approximately a specified amount of a co-polarized field of the plane wave and transmitting the remaining energy in co-polarized and cross-polarized fields.

2. The partial reflector of claim 1, wherein said first and second FSSs are gratings.

3. The partial reflector of claim 1, wherein the spacing between the first and second FSSs is not a half-wavelength or a multiple thereof of the incident plane wave.

4. The partial reflector of claim 1, wherein the spacing is approximately an odd multiple of a quarter-wavelength of the incident plane wave.

5. The partial reflector of claim 4, wherein the spacing is approximately one quarter-wavelength of the incident plane wave.

6. The partial reflector of claim 1, wherein the first and second FSSs are rotated so that the amount of one of the reflected co-polarized or cross-polarized fields lies in a non-zero range normalized to the incident plane wave and the other reflected field is approximately nulled over a predetermined bandwidth.

7. The partial reflector of claim 1, further comprising:

a tuning mechanism that rotates the first FSS with respect to the polarization of an incident plane wave to said first and rotates the second FSS with respect to the first FSS to said second angle to provide the specified amounts of the cross-polarized and co-polarized fields.

8. The partial reflector of claim 7, further comprising:

memory for storing pairs of said first and second angles for pairs of specified amounts of the reflected cross-polarized and co-polarized fields.

9. The partial reflector of claim 1, wherein said reflected cross-polarized and co-polarized fields are either in-phase or 180° out of phase.

10. The partial reflector of claim 1, wherein $\phi_1$ and $\phi_d$ are said first and second angles and $\Gamma_{x\text{-}pol}$ and $\Gamma_{co\text{-}pol}$ are the specified amounts of the reflected, magnitudes of cross-polarized and co-polarized fields respectively, wherein to a reasonable approximation, $$\phi_1 = \cot^{-1}\left(\frac{\Gamma_{x-pol}}{1+\Gamma_{co-pol}}\right), \text{ and}$$

$$\phi_d = \cos^{-1}\left(\sqrt{\frac{\cos\left(2\left(\phi_1 - \frac{\pi}{2}\right)\right) - \Gamma_{co-pol}}{1+\Gamma_{co-pol}}}\right).$$

11. The partial reflector of claim 1, wherein the achievable specified amounts of reflected $\Gamma_{x\text{-}pol}$ and $\Gamma_{co\text{-}pol}$ lie inside an outer circle of $|\Gamma_{co\text{-}pol}|^2+|\Gamma_{x\text{-}pol}|^2=1$ and outside an inner circle of $|\Gamma_{co\text{-}pol}=0.5|^2+|\Gamma_{x\text{-}pol}|^2=0.25$.

12. The cross-coupling partial reflector of claim 1, wherein the remaining energy in the co-polarized and cross-polarized fields is transmitted through the cross-coupling partial reflector in the same direction as the incident plane wave.

13. The cross-coupling partial reflector of claim 1, wherein the specified amounts of the cross-polarized and co-polarized fields that are reflected are different amounts.

14. A variable cross-coupling partial reflector for reflecting a linearly-polarized plane wave normally incident on the reflector so that the magnitude of the net reflection has a specified amount $\Gamma_{x\text{-}pol}$ of a cross-polarized field and a specified amount $\Gamma_{co\text{-}pol}$ of a co-polarized field, comprising:

a first grating;

a second grating spaced a distance behind the first grating, said first and second gratings substantially reflective to polarized waves of one polarization and substantially transmissive to the orthogonally polarized waves; and a tuning mechanism that rotates the first grating by an angle $\phi_1$ with respect to the polarization a the linearly-polarized plane wave normally incident on the reflector and rotates the second grating by an angle $\phi_d$ with respect to the first grating, wherein to a reasonable approximation $$\phi_1 = \cot^{-1}\left(\frac{\Gamma_{x-pol}}{1+\Gamma_{co-pol}}\right), \text{ and}$$

$$\phi_d = \cos^{-1}\left(\sqrt{\frac{\cos\left(2\left(\phi_1 - \frac{\pi}{2}\right)\right) - \Gamma_{co-pol}}{1+\Gamma_{co-pol}}}\right)$$

said first and second gratings reflecting the incident plane wave so that the magnitude of a net reflection has approximately the specified amount $\Gamma_{x\text{-}pol}$ of a cross-polarized field of the plane wave and approximately the specified amount $\Gamma_{co\text{-}pol}$ of a co-polarized field of the plane wave and transmitting the remaining energy in co-polarized and cross-polarized fields.

15. The partial reflector of claim 14, further comprising:

a look-up table storing angle pairs ($\phi_1$, $\phi_d$) pairs for specified ($\Gamma_{x\text{-}pol}$, $\Gamma_{co\text{-}pol}$) pairs.

16. The partial reflector of claim 14, wherein $\Gamma_{co\text{-}pol}$ is approximately 0.

17. The partial reflector of claim 14, wherein said reflected cross-polarized and co-polarized fields are either in-phase or 180° out of phase.

18. The partial reflector of claim 14, wherein the achievable specific amounts of reflected $\Gamma_{x\text{-}pol}$ and $\Gamma_{co\text{-}pol}$ lie inside an outer circle of $|\Gamma_{co\text{-}pol}|^2+|\Gamma_{x\text{-}pol}|^2=1$ and outside an inner circle of $|\Gamma_{co\text{-}pol}+0.5|^2+|\Gamma_{x\text{-}pol}|^2=0.25$.

19. A method of controlling reflected power from an incident plane wave, comprising:

providing a first frequency selective surface (FSS) in the path of a polarized plane wave;

providing a second FSS behind the first FSS in said path, said first and second FSSs substantially reflective to polarized waves of one polarization and substantially transmissive to the orthogonally polarized waves;

rotating said first FSS by a first angle with respect to the polarization of the incident plane wave and rotating the second FSS by a second angle with respect to the first FSS;

reflecting the incident polarized plane wave off of the first and second FSSs so that the magnitude of a net reflection has approximately a specified amount of a cross-polarized field of the plane wave and approximately a specified amount of a co-polarized field of the plane wave; and transmitting the remaining energy through the first and second FSSs in co-polarized and cross-polarized fields.

20. The method of claim 19, wherein the said first and second FSS are spaced apart by a quarter-wavelength of the incident plane wave or an odd multiple thereof.

21. The method of claim 19, wherein the first and second FSSs are rotated so that the amount of one of the reflected co-polarized or cross-polarized fields lies in a non-zero range normalized to the incident plane wave and the other reflected field is approximately nulled over a predetermined bandwidth.

22. The method of claim 19, further comprising:

storing pairs of said first and second angles for pairs of specific amounts of the reflected cross-polarized and co-polarized fields in memory; and reading a pair of said first and second angles from memory for the specified amounts of reflected cross-polarized and co-polarized fields.

23. The method of claim 19, wherein $\phi_1$ and $\phi_d$ are said first and second angles and $\Gamma_{x\text{-}pol}$ and $\Gamma_{co\text{-}pol}$ are the specific amounts of the cross-polarized and co-polarized fields respectively, wherein said first and second FSS are rotated to $\phi_1$ and $\phi_d$ which to a reasonable approximation are given by:

$$\phi_1 = \cot^{-1}\left(\frac{\Gamma_{x-pol}}{1+\Gamma_{co-pol}}\right), \text{ and}$$

$$\phi_d = \cos^{-1}\left(\sqrt{\frac{\cos\left(2\left(\phi_1 - \frac{\pi}{2}\right)\right) - \Gamma_{co-pol}}{1+\Gamma_{co-pol}}}\right).$$

24. The method of claim 23, further comprising:

measuring the actual reflected fields $\Gamma_{x\text{-}pol}$ and $\Gamma_{co\text{-}pol}$; and adjusting the rotation of said first and second FSSs until the measured $\Gamma_{x\text{-}pol}$ and $\Gamma_{co\text{-}pol}$ are within an acceptable tolerance of the specific amounts of the reflected co-polarized or cross-polarized fields.

25. A quasi-optical electromagnetic array structure, comprising:

cross-polarized input and output antennas;

an amplifier array that amplifies energy absorbed by the input antenna and reradiates the amplified energy from the output antenna; and a partial reflector including first and second frequency selective surfaces (FSSs), said first and second FSSs substantially reflective to polarized waves of one polarization and substantially transmissive to the orthogonally polarized waves, said first FSS rotated at a first with respect to the polarization of the input antenna and said second FSS rotated at a second angle with respect to the first FSS so that a net reflection of energy reradiated from the output antenna and incident on the cross-coupling reflector has approximately specified amount of a cross-polarized field and approximately a specified amount of a co-polarized field with respect to the polarization of the input antenna, said remaining energy transmitted through the partial reflector in co-polarized and cross-polarized fields.

26. The quasi-optical electromagnetic array structure of claim 25, wherein said structure operates as an oscillator by setting said first and second angles so as to induce oscillations and synchronize said amplifier array to produce coherent power.

27. The quasi-optical electromagnetic array structure of claim 26, wherein said first and second angles are set to approximately null the co-polarized field.

28. A quasi-optical electromagnetic array structure, comprising:

a plurality of active amplification devices arranged in an array, wherein an input of each active amplification device is cross-polarized with respect to an output of each active amplification device; and a partial reflector disposed in a spaced relation with the plurality of active amplification devices so as to couple cross polarized input and output of each active amplification device, wherein said partial reflector includes:

a first frequency selective surface (FSS) rotated by a first angle with respect to the input, and a second FSS spaced behind the first FSS and rotated by a second angle with respect to the first FSS, said first and second FSSs substantially reflective to polarized waves of one polarization and substantially transmissive to the orthogonally polarized waves, whereby a net reflection of energy radiated from the output and incident on the partial reflector has approximately a specified amount of a cross-polarized field and approximately a specified amount of a co-polarized field with respect to the polarization of the input, said remaining energy transmitted through the partial reflector in co-polarized and cross-polarized fields.

29. The quasi-optical electromagnetic array structure of claim 28, wherein said structure operates as an amplifier by setting said first and second angles so as to cause an incoming energy to be absorbed by the input of each active amplification device, amplified and reradiated in the crossed polarization from the output of each active amplification device.

30. The quasi-optical electromagnetic array structure of claim 28, wherein energy waves propagate through an input waveguide coupled to the active amplification devices and reflect off of the first and second FSSs into the inputs of each active amplification device, and after amplification are at least partially reradiated in a cross polarization from the output of each active amplification device through the partial reflector.

31. The quasi-optical electromagnetic array structure of claim 28, wherein said structure operates as an oscillator by setting said first and second angles so as to induce oscillations and synchronize said plurality of active devices to produce coherent power.

32. The quasi-optical electromagnetic array structure of claim 31, wherein said first and second angles are set to approximately null the co-polarization.

33. The quasi-optical electromagnetic array structure of claim 31, wherein energy waves reflect off of the first and second FSSs into the inputs of each active amplification device and after amplification are at least partially reradiated in a cross polarization from the output of each active amplification device through the partial reflector.

* * * * *